Oct. 20, 1970                J. J. QUACKENBUSH                3,534,437
                  APPARATUS FOR EXTRUDING REINFORCED PLASTIC TUBING
Filed Dec. 11, 1967                                    3 Sheets-Sheet 2

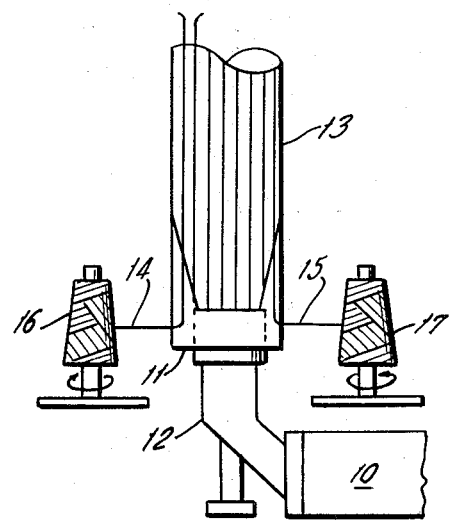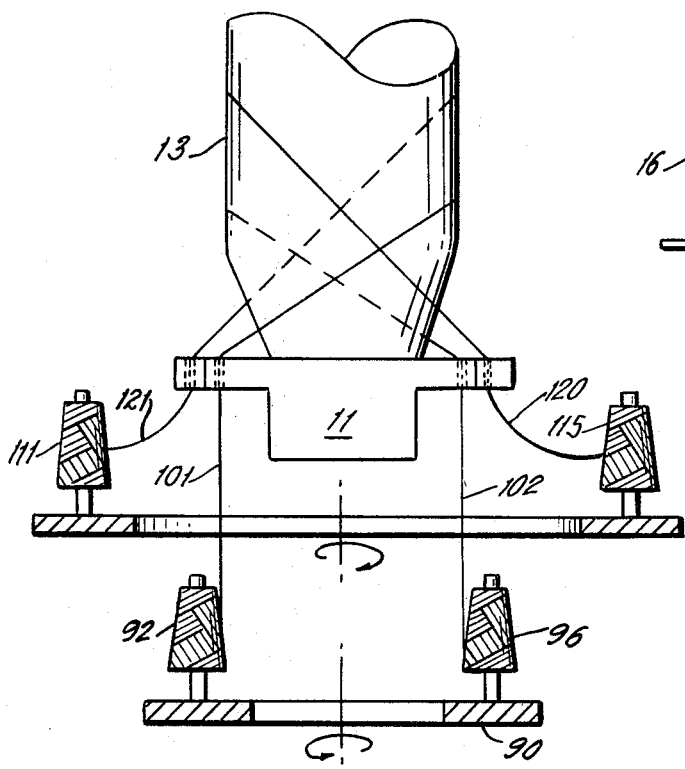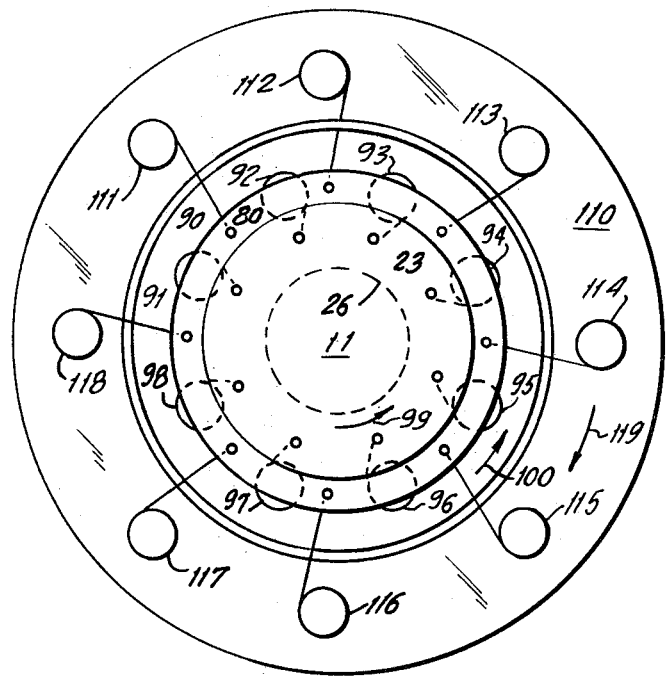

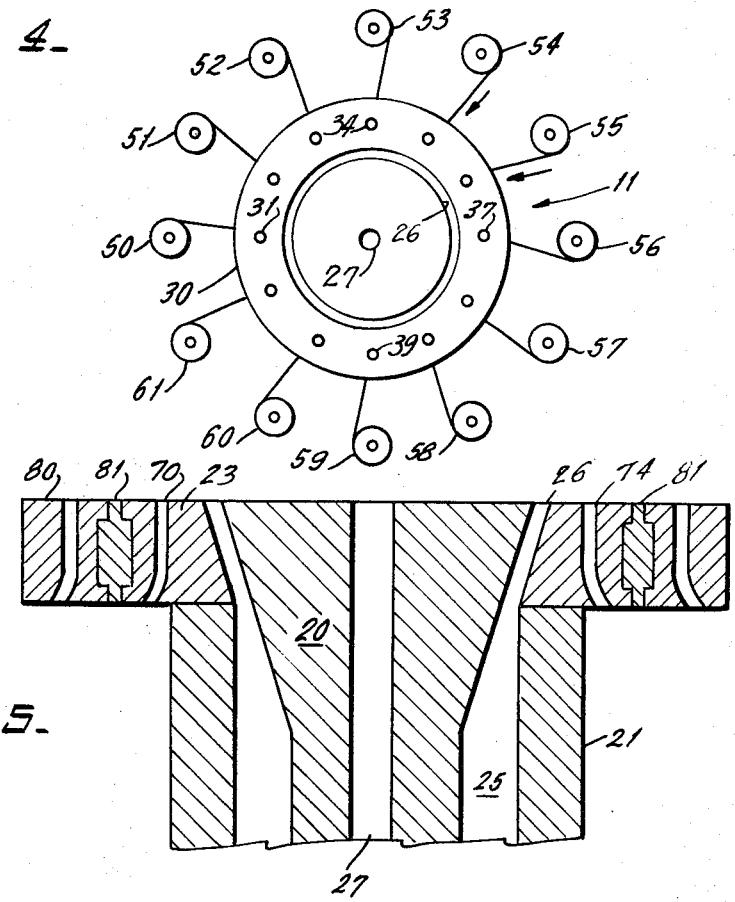
FIG. 4
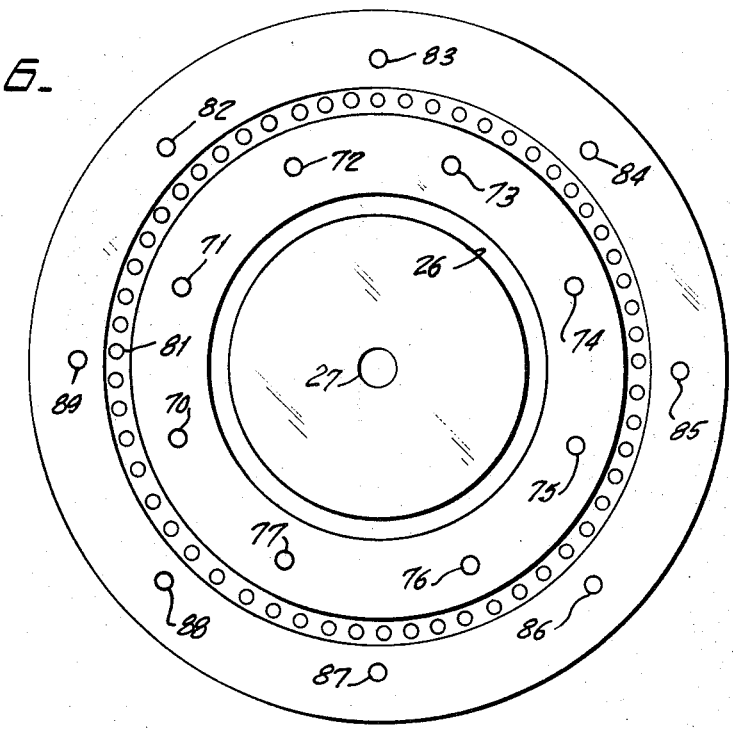
FIG. 5
FIG. 6

United States Patent Office 3,534,437
Patented Oct. 20, 1970

3,534,437
APPARATUS FOR EXTRUDING REINFORCED PLASTIC TUBING
John J. Quackenbush, Monroe, Conn., assignor to National Distillers and Chemical Corporation, New York, N.Y., a corporation of Virginia
Filed Dec. 11, 1967, Ser. No. 689,498
Int. Cl. B29f 3/04
U.S. Cl. 18—13          4 Claims

ABSTRACT OF THE DISCLOSURE

A plurality of sources of reinforcing filaments, such as yarn, surround the extrusion die for extruding blown plastic film, and are fed toward surface through a plurality of apertures in a ring surrounding the discharge orifice of the die. The filaments adhere to the outer surface of the tube, thereby forming a filament reinforcement for the finished product. The ring and a second concentric ring may rotate with respect to one another to form a reinforcing mesh on the tube surface.

---

This invention relates to the extrusion of plastic film tubes, and more particularly relates to apparatus for applying reinforcing filaments to the tube surface.

The extrusion of plastic film in tubular form is well known for forming a plastic tube which is subsequently formed into finished plastic products such as bags and the like. It is known, for the case of the extrusion of flat plastic film, to apply reinforcing strands of yarn, or other filamentary materials, to the flat film surface to cause reinforcement of the products formed from the flat film.

The present invention permits the application of reinforcing filaments to blown film apparatus, thereby to form reinforced tubular film which can be subsequently formed into bag structures, or slit to reinforced sheet form.

It is, therefore, a primary object of this invention to provide apparatus for reinforcing extruded plastic film tubes during the extrusion thereof.

Another object of this invention is to provide a novel apparatus for forming an inexpensive reinforced plastic tube.

These and other objects of this invention will become apparent from the following description when taken in connection with the drawings, in which:

FIG. 1 shows a schematic side elevation view of a typical blown film extrusion apparatus incorporating the present invention.

Figure 2:
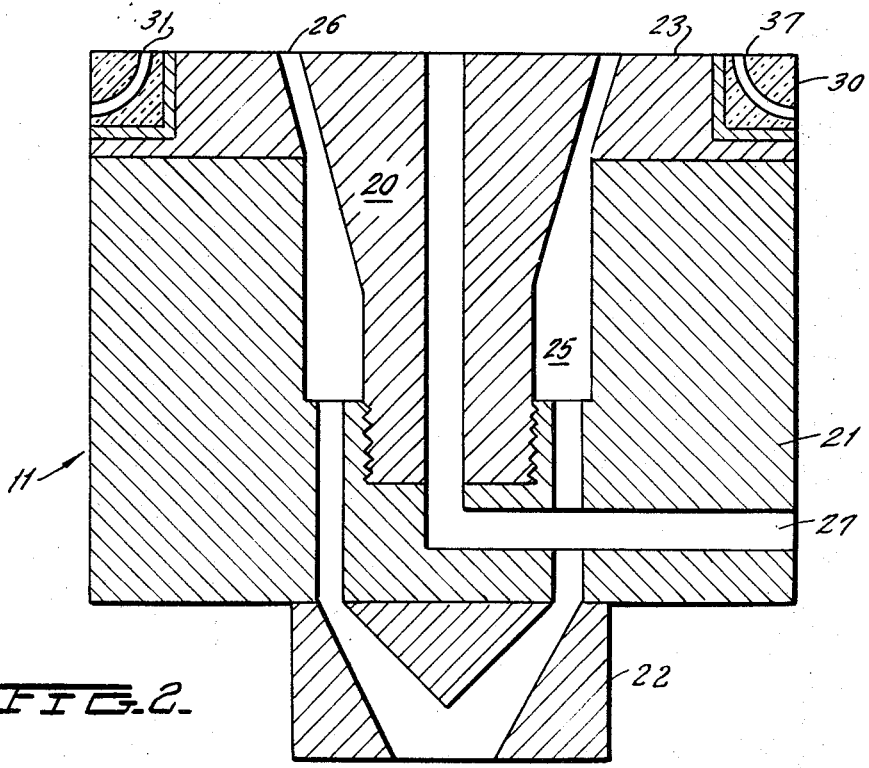
FIG. 2 shows a cross-sectional view of the die of FIG. 1, modified in accordance with the invention.
Figure 3:
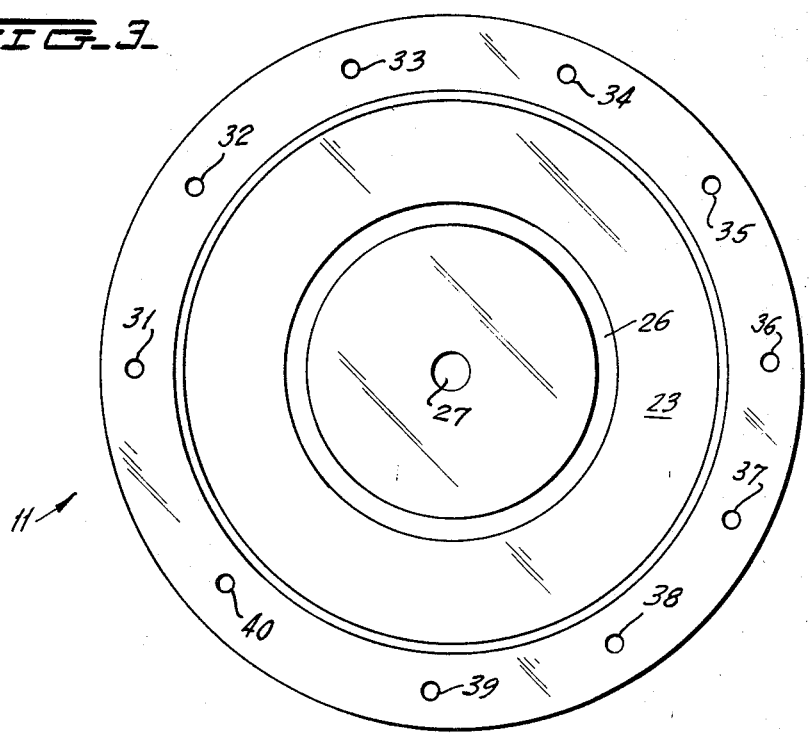
FIG. 3 is a top view of FIG. 2.

FIG. 4 schematically shows the placement of filamentary sources for the die of FIGS. 2 and 3 in the arrangement of FIG. 1.

FIG. 5 is a cross-section of a second die arrangement for the die of FIGS. 2 and 3.

FIG. 6 is a top view of the die of FIG. 5.

FIG. 7 is a schematic side elevation of apparatus using the die of FIGS. 5 and 6.

FIG. 8 schematically shows the placement of filamentary sources for the die of FIGS. 5 and 6 in the arrangement of FIG. 7.

Referring first to FIG. 1, there is shown a standard extruder 10 connected to an extrusion die 11 by an adapter 12. Die 11 conventionally extrudes a plastic tube 13, of polyethylene, or the like, which is collapsed at its top by suitable nip rolls (not shown), and the tube is rolled on storage rolls, or feeds, into other apparatus such as a bag-making machine, or the like. In accordance with the invention, and as will be later described, a plurality of filament guide channels are formed around the exterior of tube 13 to guide filaments such as filaments 14 and 15, which surround the exterior of tube 13, toward the outer surface of tube 13 to engage the tube where it is still semi-molten. A plurality of such filaments are shown in FIG. 1. The filaments of FIG. 1 could be of any desired material such as cotton yarn, nylon, or any other desired flexible, elongated material, hereinafter, a filamentary material.

The filaments of FIG. 1, such as filaments 14 and 15, are supplied from sources such as bobbins 16 and 17 which are rotatably mounted on fixed supports. This arrangement will then form parallel reinforcing filaments, coaxial with the axis of tube 13. As will be seen, if the support for bobbins 16 and 17 is rotated, or the die 11 is rotated, the reinforcing filaments will wind around the tube 13 as the tube 13 is extruded upwardly.

FIGS. 2 and 3 show a standard type die and filament ring means for the filaments, which could be used in FIG. 1. The die of FIGS. 1 and 2 is comprised of a central mandrel 20 and outer die body 21 which are connected to an adapter 22 which is connected to extruder 10. A die ring 23 is connected to body 21 with mandrel 20, body 21 and ring 23 defining an annular channel 25 having a discharge orifice 6, through which a plastic tube is extruded. A channel 27 permits the injection of air into the plastic tube which is extruded to prevent collapse of the tube.

In accordance with the invention, an orifice ring 30 is cemented or otherwise secured to a notch in the exterior of ring 23. Orifice ring 30 contains a plurality of equally spaced arcuate channels 31 to 40 which may have a diameter of ¼ inch and have polished interior surfaces. Ring 30 should be of a hard material such as tungsten carbide or glass, or the like, with the filament from the exterior filament sources passing through these various orifices.

Thus, as shown in FIG. 4, a plurality of bobbins such as bobbins 50 to 61 are positioned around die 11 with their filaments extending through the adjacent orifices in ring 30.

FIGS. 5 and 6 show a second embodiment of a die structure in which components similar to those of FIGS. 2 and 3 have similar identifying numerals. Thus, in FIGS. 5 and 6 die ring 23 is constructed with a first internal group of arcuate orifices 70 to 77. A second outer orifice ring portion 80 is then connected to ring 23 by a plurality of bearings 81, or in any desired manner whereby ring 80 is rotatable with respect to ring 23. Outer ring 80 then carries a plurality of arcuate orifices 82 to 87, thereby to define an outer group of orifices which are rotatable with respect to the orifices of ring 23.

The die structure 11, modified as shown in FIGS. 5 and 6, is then arranged in a system, as shown in FIGS. 7 and 8, for reinforcing plastic tube 13. In FIGS. 7 and 8, a rotatable ring support 90, rotatable around the axis of tube 13 is shown as carrying filament supply bobbins 91 to 98. Die 11 is further arranged to be of the rotatable type and rotates (with ring 23) in the direction of arrow 99, while ring 90 rotates in the direction, as shown by arrow 100. All the filaments from bobbins 91 to 98 are threaded through inner orifices 70 to 77 (FIG. 6). Thus, filaments 101 and 102, for example, from bobbins 92 and 96 will wind around tube 13 in a clockwise direction in FIG. 8.

A second rotatable ring 110 surrounds the axis of tube 13 and carries bobbins 111 to 118 and rotates in the direction of arrow 119. The filaments from bobbins 111 to 118 are threaded through orifices, such as orifices 82 to 87 of ring 80 of FIG. 6. These filaments, such as filaments 19 and 120 in FIG. 7, of bobbins 111 and 115 will wind around tube 13 in a counterclockwise direction in FIG. 8, thereby forming a mesh of reinofrcing filaments on the exterior of tube 13. Note that ring 80 will be rotated clockwise in FIG. 8 by the filaments from rotating bobbins 111 to 118.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. Apparatus for extruding a reinforced plastic tube comprising an extrusion die having an annular discharge orifice for extruding an inflated tube of plastic material; a plurality of sources of elongated filaments; orifice ring means comprising an exterior ring surrounding said discharge orifice and having a plurality of spaced openings extending therethrough; each of said openings having a first end terminating in a common plane and adjacent said discharge orifice and a second end facing a respective one of said source of elongated filaments; said filaments of each of said sources extending through a respective opening of said plurality of openings; each of said filaments movable through their said respective openings and movable with a plastic tube extruded through said discharge orifice.

2. The apparatus of claim 1 wherein said openings have an arcuate axis extending through said ring which moves inwardly and upwardly of said ring.

3. The apparatus as set forth in claim 1 which includes common support means connected to each of said sources of filaments; said common support means encircling the axis of said extrusion die.

4. The apparatus as set forth in claim 1 which includes a second, outer ring rotatably connected to the orifice ring means and having a second plurality of openings therein and a second plurality of sources of elongated filaments surrounding said second ring; the filaments of said second plurality of sources extending through respective openings in said second ring and being movable therethrough whereby said filaments are directed into engagement with the outer surface of a plastic tube extruded from said discharge orifice.

References Cited

UNITED STATES PATENTS

| | | |
|---|---|---|
| 1,317,426 | 9/1919 | Brennan. |
| 2,810,424 | 10/1957 | Swarlswelter et al. __ 18—13 XR |
| 2,844,846 | 7/1958 | Kronholm _____ 18—14 |
| 3,222,722 | 12/1965 | Reyenhauser _____ 18—14 XR |
| 3,303,251 | 2/1967 | Heider et al. _____ 18—13 XR |
| 3,354,506 | 11/1967 | Raley _____ 18—14 |
| 3,355,768 | 12/1967 | Ryan _____ 18—14 |
| 3,375,550 | 4/1968 | Klein _____ 18—14 XR |

J. SPENCER OVERHOLSER, Primary Examiner

M. O. SUTTON, Assistant Examiner

U.S. Cl. X.R.

18—12, 14